US008850354B1

(12) United States Patent
Titov et al.

(10) Patent No.: US 8,850,354 B1
(45) Date of Patent: Sep. 30, 2014

(54) MULTI-WINDOW WEB-BASED APPLICATION STRUCTURE

(75) Inventors: Dmitry Titov, Redmond, WA (US); Michael Paul Davidson, Seattle, WA (US)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 12/784,888

(22) Filed: May 21, 2010

(51) Int. Cl.
*G06F 3/048* (2013.01)
*G06F 3/01* (2006.01)

(52) U.S. Cl.
USPC ........... 715/804; 715/781; 715/794; 715/790; 715/802; 715/788; 345/156; 345/173

(58) Field of Classification Search
USPC ......... 715/765, 781, 794, 790, 802, 764, 788, 715/795, 796, 797
See application file for complete search history.

(56) References Cited

U.S. PATENT DOCUMENTS

| | | | | |
|---|---|---|---|---|
| 4,428,065 | A * | 1/1984 | Duvall et al. | 707/745 |
| 5,345,551 | A * | 9/1994 | Shelley et al. | 715/804 |
| 6,008,809 | A * | 12/1999 | Brooks | 715/792 |
| 7,308,449 | B2 * | 12/2007 | Fairweather | 1/1 |
| 7,702,678 | B2 * | 4/2010 | Teague | 707/722 |
| 7,958,453 | B1 * | 6/2011 | Taing | 715/744 |
| 2002/0075326 | A1 * | 6/2002 | Allen | 345/853 |
| 2002/0083098 | A1 * | 6/2002 | Nakamura | 707/513 |
| 2002/0138624 | A1 * | 9/2002 | Esenther | 709/227 |
| 2004/0064510 | A1 * | 4/2004 | Ooi et al. | 709/205 |
| 2004/0243943 | A1 * | 12/2004 | Matsumoto et al. | 715/841 |
| 2005/0278698 | A1 * | 12/2005 | Verco | 717/116 |
| 2006/0168547 | A1 * | 7/2006 | Boyles et al. | 715/854 |
| 2006/0206825 | A1 * | 9/2006 | Dorn et al. | 715/761 |
| 2006/0259857 | A1 * | 11/2006 | Atkins | 715/517 |
| 2006/0265665 | A1 * | 11/2006 | Yoshida | 715/781 |
| 2006/0282548 | A1 * | 12/2006 | Yoshida et al. | 710/1 |
| 2007/0044035 | A1 * | 2/2007 | Amadio et al. | 715/781 |
| 2007/0107032 | A1 * | 5/2007 | Rachamadugu | 725/114 |
| 2007/0185959 | A1 * | 8/2007 | Huck et al. | 709/204 |
| 2008/0077936 | A1 * | 3/2008 | Goel et al. | 719/312 |
| 2008/0082955 | A1 * | 4/2008 | Andreessen et al. | 717/100 |

(Continued)

OTHER PUBLICATIONS

Schultz, Greg, IT Communication—Web Authoring and Surfing, "*Using Inline Frames (iframe elements) to Embed Documents Into HTML Documents*." http://www.cs.tut.fi/~jkorpela/html/iframe.html, updated Feb. 27, 2004, 12 pages.

(Continued)

*Primary Examiner* — Amy Ng
*Assistant Examiner* — Toan Vu
(74) *Attorney, Agent, or Firm* — Sterne, Kessler, Goldstein & Fox P.L.L.C.

(57) ABSTRACT

Systems and methods for providing a multi-window application to a user over a network are provided. An exemplary method includes presenting a first frame to the, the first frame containing application logic. The method further includes presenting a second frame to the user, the second frame containing user interface logic. Steps in the method create a relationship between the first frame and the second frame allowing the user interface logic of the second frame to use the application logic contained in the first frame. When an indication is received that the first frame is to be closed, and an application-specific condition is true, the application logic is transferred from the first frame to the second frame using a command, while preserving the state of the second frame. The first frame is then closed.

22 Claims, 7 Drawing Sheets

(56) References Cited

U.S. PATENT DOCUMENTS

| | | |
|---|---|---|
| 2009/0198787 A1* | 8/2009 | Broda et al. .................. 709/209 |
| 2009/0254569 A1* | 10/2009 | Paulk et al. ..................... 707/10 |
| 2010/0011292 A1* | 1/2010 | Marinkovich et al. ........ 715/716 |
| 2010/0191799 A1* | 7/2010 | Fiedorowicz et al. ........ 709/203 |
| 2011/0144970 A1* | 6/2011 | Jiang et al. ..................... 703/24 |

OTHER PUBLICATIONS

Raggett, Dave, Le Hors, Arnaud and Jacobs, Ian, HTML 4.01 Specification, W3C Recommendation Dec. 24, 1999, Abstract and Table of Contents, copyright 1997-1999, 12 pages, "*16.5 Inline Frames: the IFRAME Element*," 2 pages.

* cited by examiner

MULTI-WINDOW WEB-BASED APPLICATION STRUCTURE

FIELD

Embodiments of the present application generally relate to dynamic web coding and browser-based applications.

BACKGROUND

As the popularity of multi-window web-based applications increases, users are demanding increased sophistication in the way their web browsers and implemented applications handle multi-window behaviors. Users are increasingly expecting their web application user experience to match their user experience with traditional installed applications. With the increasing popularity of wireless, full function mobile devices, e.g., netbooks, tablet and "pad" devices, the need for satisfying web-based applications is further increasing.

One problem that can occur when trying to approximate the user interface of a non-web application with a web application is the latency that comes from network-based functions. That is, when an interface item loads in a web interface, instead of being displayed virtually instantaneously, as with a locally installed application, a user has to wait for an interface item to load. Another problem that can occur relates to the elements used to layout a web page, e.g., HyperText Markup Language (HTML) elements.

Over the years, different approaches have been taken to give web applications interface features similar to non-web based applications. One key feature developed to help web applications simulate traditional interfaces is the use of multiple windows. The latency and layout element problems noted above, however, can significantly affect the user experience when multiple windows are used.

Problems can be even more pronounced when multiple windows include references to dynamic client-side web content, such as JavaScript. In some circumstances, inefficiencies in current approaches can cause large portions of application logic to require reloading on the client before use. This content can often be large in size, e.g., over one megabyte, and cause latency issues. In addition, current approaches mandate that the state of a window be reloaded. This reloading causes extra latency in window performance and potentially interrupting the flow of the web application.

Weaknesses in current approaches to multi-window applications require both improved coding structures and mechanisms for using the new structures that do not cause backward compatibility issues. Countless websites have been designed that rely upon aspects of current multi-window approaches, and these sites should not be negatively affected by solutions.

What is needed are improved windowing elements that allow multi-window applications to have the advantages of traditional approaches while minimizing the weaknesses, including potential issues of backward compatibility.

BRIEF SUMMARY

According to an embodiment, a method for providing a multi-window application to a user over a network is provided. The exemplary method includes presenting a first frame to the user, the first frame containing application logic. The method further includes presenting a second frame to the user, the second frame containing user interface logic. Steps in the method create a relationship between the first frame and the second frame allowing the user interface logic of the second frame to use the application logic contained in the first frame. When an indication is received that the first frame is to be closed, if an application-specific condition is true, the application logic is transferred from the first frame to the second frame using a command, and while preserving the state of the second frame. The first frame is then closed.

According to another embodiment, a system for providing a multi-window application over a network includes a window inheritance controller and a first frame element, the first frame element containing a script. The system further includes a second frame element, the second frame element having a link to the first frame element that allows use of the script. If an application-specific condition is true, the second frame element receives the contents of the first frame element while retaining programming state. Finally, a closing element is configured to close the first frame element. Upon notice that the first web browser is closing, the window inheritance controller transfers the contents of the first frame element into the second frame element using a command.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The following detailed description refers to the accompanying drawings that illustrate exemplary embodiments. Embodiments described herein relate to providing systems and methods for providing a multi-window application to a user over a network. Other embodiments are possible, and modifications can be made to the embodiments within the spirit and scope of this description. Therefore, the detailed description is not meant to limit the embodiments described below.

It would be apparent to one of skill in the relevant art(s) that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

Figure 1A:
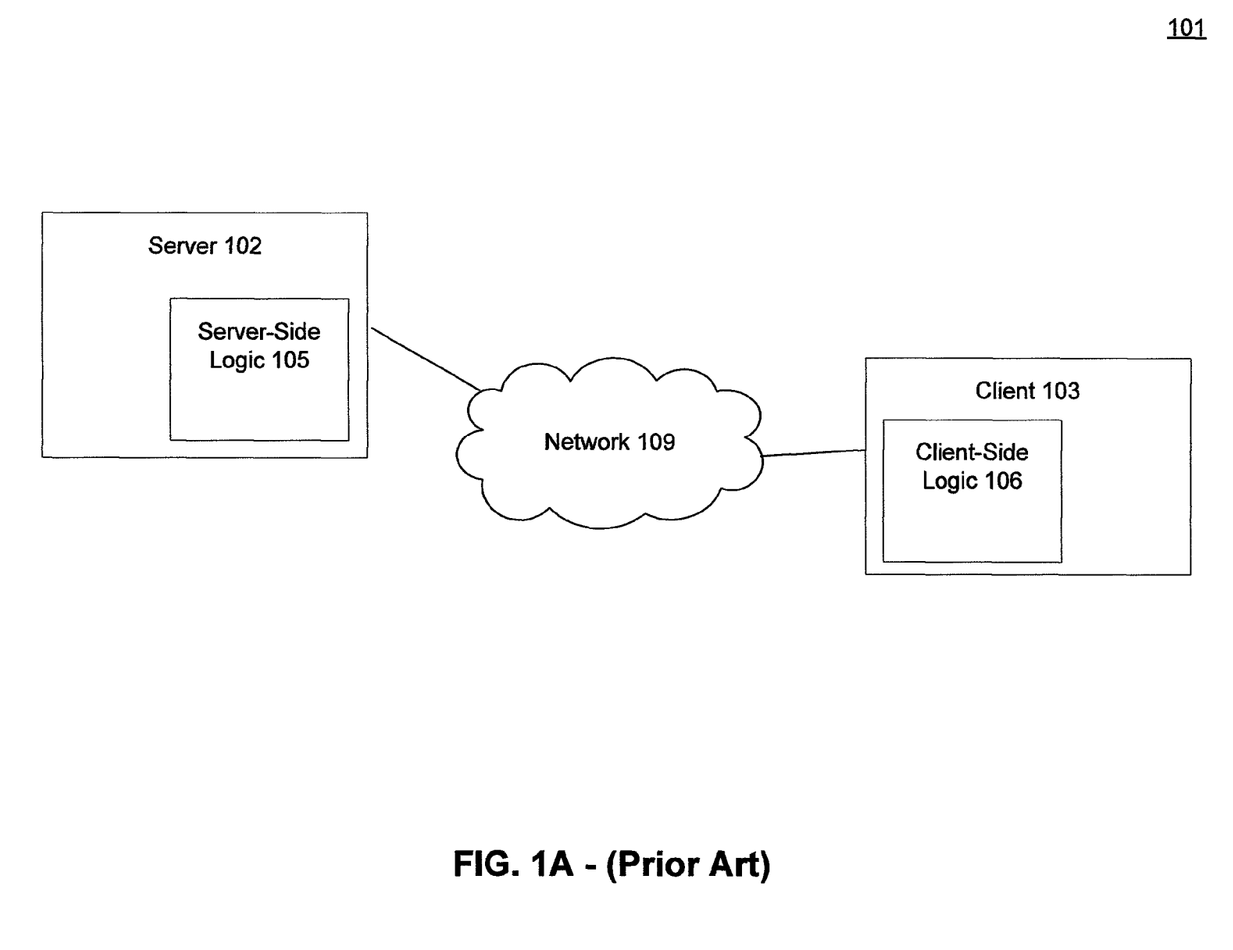
FIGS. 1A-C illustrate aspects of traditional multi-window web-based applications.

FIG. 1A shows a system 101 having server 102 and client 103 connected by network 109. System 101 is used to provide web-based applications to a user of client 103. As would be appreciated by one having skill in the art, web-based applications are provided as a combination of server-side logic 105 and client-side logic 106. Examples of client-side logic 106 include client-side scripting languages such as JAVASCRIPT, developed by Netscape Communications Corp. of Mountain View, Calif. and VBSCRIPT by Microsoft Corp. of Redmond, Wash. Examples of server-side logic include JAVA by Oracle Corp., and ASP by Microsoft Corp.

Because of the delays involved in transferring information over network 109, a key feature of a web-based application is the frequency at which client-side logic is loaded and updated on client 103. Another challenge in the development of web-based applications is the maintaining of "state" between different components in the system, e.g., between client-side logic 106 and server-side logic 105, and between client-side logic 106 components.

Figure 1B:
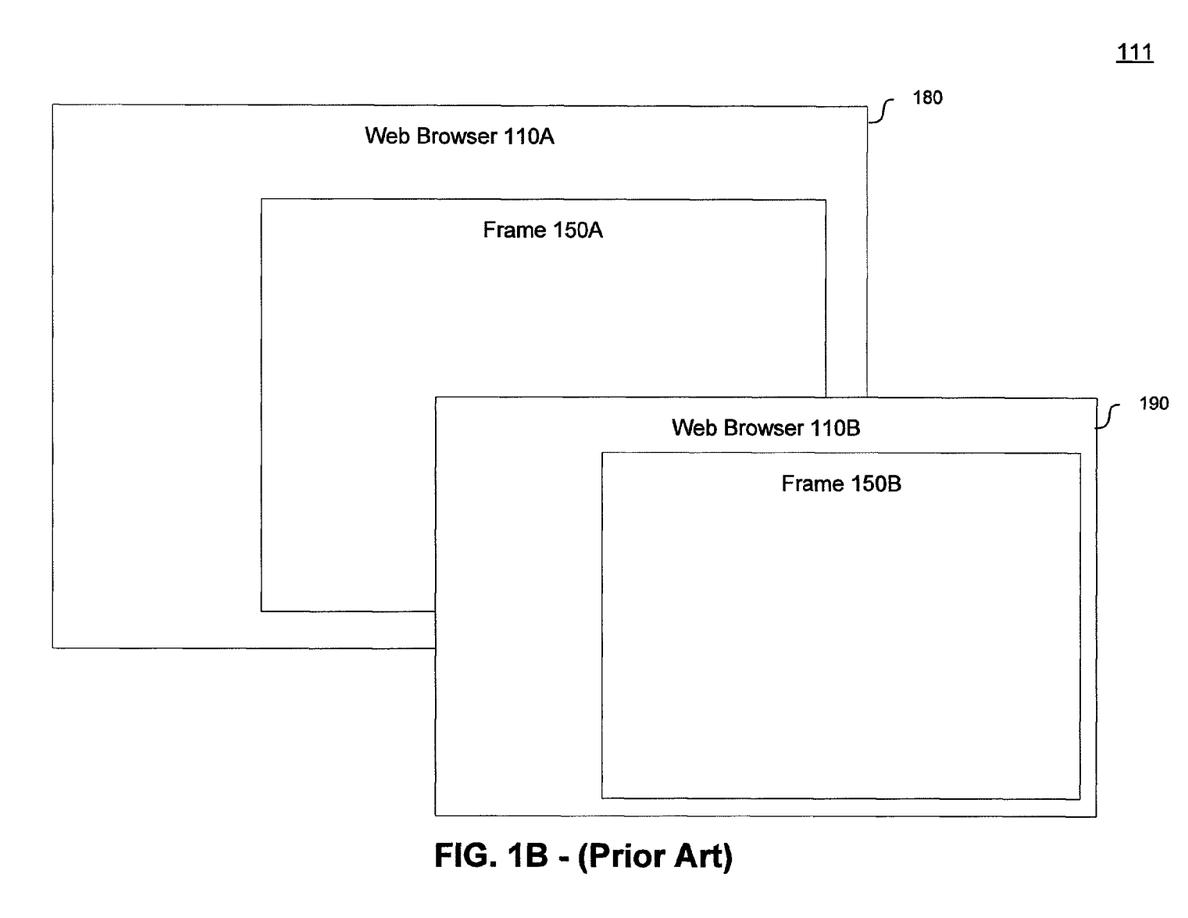

FIG. 1B is an illustration of a traditional multi-window web-based application 111, according to an embodiment. An example of a multi-window function in a web-based application begins with web browser window 110A displaying main window 180, such window having frame 150A.

As used typically herein, the term "frame" broadly indicates a design element used with HTML and script to present content in a web browser window. A single web browser window can have one or more frames. Frames can include a user display element, as in "the frame has a button" and a programming or scripting element (scripting object), as in "the frame contains several JavaScript routines." An example frame element includes the HTML iframe (or iFrame) object, such object typically used to display one HTML document inside of another HTML document. The iframe and similar layout elements are used extensively in web-based applications. Because a frame can also be a user interface element, it can also be referred to as a "window." The combination of a frame and a web browser window can also be referred to as a window, as in "the web-application spawns a pop-up window using a web-browser window having a frame."

As used typically herein, the expression "transfer a frame" generally refers to moving a portion of the contents of a frame to another frame. Practically, this can entail the following examples T1-T2:

T1. Moving the contents of a frame from a display in one web browser window to a frame in another web browser window.

T2. Moving the contents of a frame to another frame displayed in the same web browser window.

The list T1-T2 above is intended to be non-limiting. One having skill in the relevant art(s) will appreciate that other transfers of logic and display content between frame-type display elements could benefit from the descriptions herein.

This transfer can also be described as "changing the ownership" of a frame, as in "changing the ownership of a frame from one document to another." Because frames may include logic (script, code, automation, functionality, subroutines), when a frame moves from one document (HTML page) to another, this logic can now be available to the new document.

Some descriptions used herein refer to the Document Object Model (DOM), such model being a cross-platform and language-independent convention for representing and interacting with objects in HTML, XHTML and XML documents. Aspects of the DOM (such as its "Elements") may be addressed and manipulated using DOM commands. Frames used in HTML documents can be manipulated (e.g., moved) using DOM commands/methods, e.g., the adoptNode command and the appendChild command.

As noted above, frame 150A can have client side logic 106 that controls different aspects of the web-based application. In this example, frame 150A contains JavaScript that performs application functions.

From a user request, a "pop up" window 190 having frame 150B is spawned in new web browser window 110B to serve a particular application function. An example pop-up function includes a web-based email application spawning a new browser window to present a "composing window" for a new email. Such a composing window allows a user to look at other parts of the email application, their inbox for instance, while composing a new email. When these two windows (180, 190) are active, they are logically a part of the same web-based application.

In this example, frame 150B is created with a duplicate of the client-side logic associated with frame 150A. In this example, because frame 150B has a copy of the same client-side logic that is associated with frame 150A, if frame 150A were terminated, the frame 150B could continue execution. While these windows are logically joined in application code, they are essentially independent of one another. One having skill in the relevant arts will know that this duplicate code approach between windows and sub-windows is the "expected" relationship in this multi-window situation.

A potential reduction in user satisfaction can be associated with instances of the FIG. 1B approach. This interface weakness comes from the complexity and size of modern multi-window web based applications. Large amounts of client-side logic 106 (code), e.g., JavaScript and HTML, can cause the pop-up window to load with a latency that negatively impacts the user experience. Frame 150B may only require a fraction of the code used in frame 150A, but under this approach all of the frame 150A code must be transferred upon the creation of frame 150B. This transfer may take place on the client-side, directly from frame 150A to 150B, or may occur by reloading frame 150A from server 102 via network 109.

This latency in pop-up windows is of particular concern to web developers because it is significantly different from a comparable user experience in non-web based applications. Non-web based applications typically do not have any latency with pop-up windows, and reduction in user satisfaction in this area could cause a user to avoid a web-based application in favor of the non-web alternative.

Figure 1C:
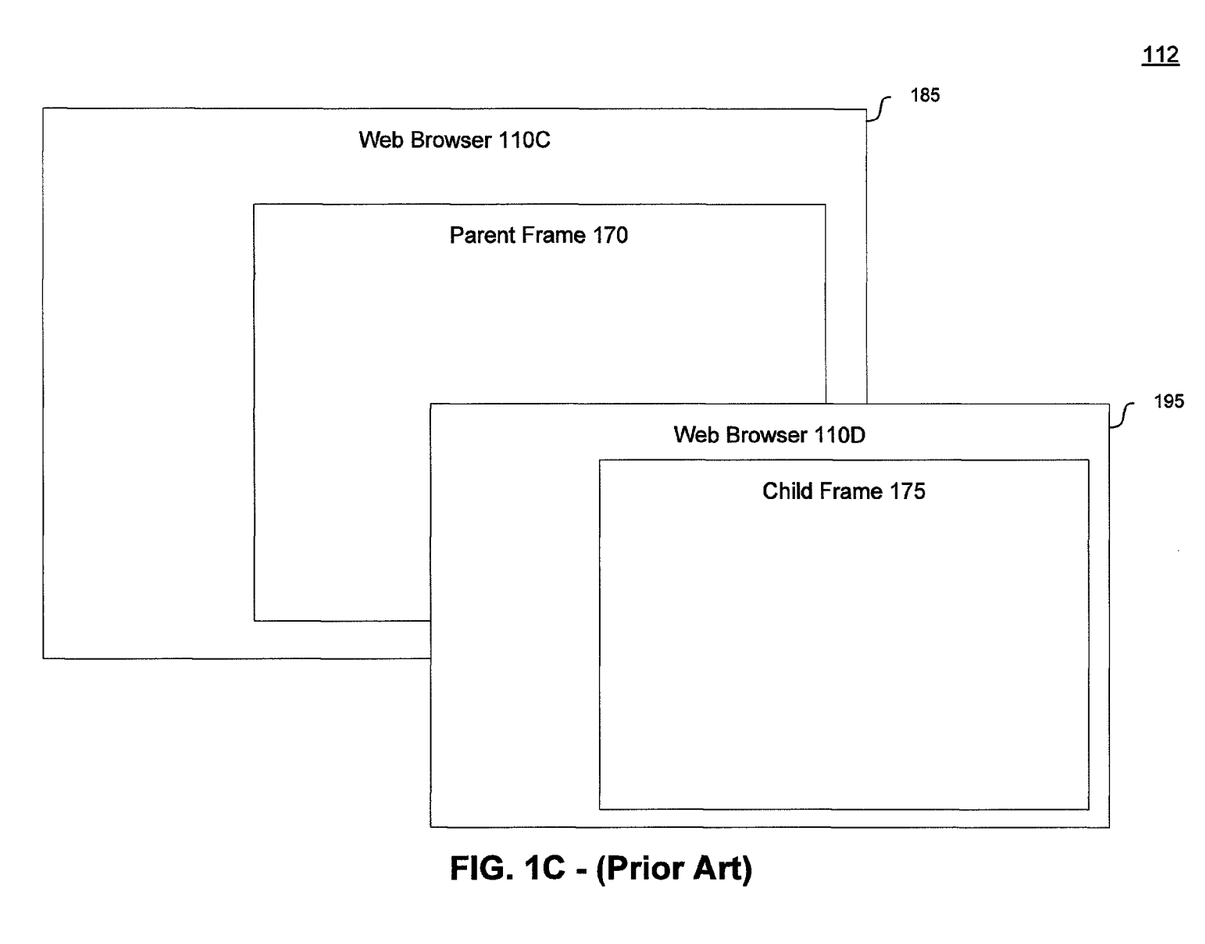

In FIG. 1C, a second traditional approach to multi-window web-applications is presented. This second approach uses principles of inheritance to share code between parent frame 170 displayed in web browser window 110C, and child frame 175 displayed in web browser window 110D. In this approach, to implement pop-up window 195 from main window 185, child frame 175 is spawned having only user interface elements, and having a "handle" to parent window 170. In this approach, the handle allows child frame 175 to access client-side logic 106 from parent frame 170 while not requiring a duplicate copy to be loaded in child frame 175. As would be appreciated by one having skill in the relevant art(s), this allows child frame 175 to open very quickly.

A potential for reduction in user satisfaction that can be associated with usage of the second traditional approach comes from the dependency of child frame 175 upon parent frame 170. In contrast to the independence between the frames of the first approach from FIG. 1B, with the second approach, if parent frame 170 is terminated, child frame 175 must be terminated as well, with a resulting loss of state in child frame 175.

As discussed above, the traditional approaches to handling the relationship and behavior between the main window and secondary (pop-up) windows described with FIGS. 1B-C each have aspects that can negatively impact the user experience in some circumstances.

Figure 2:
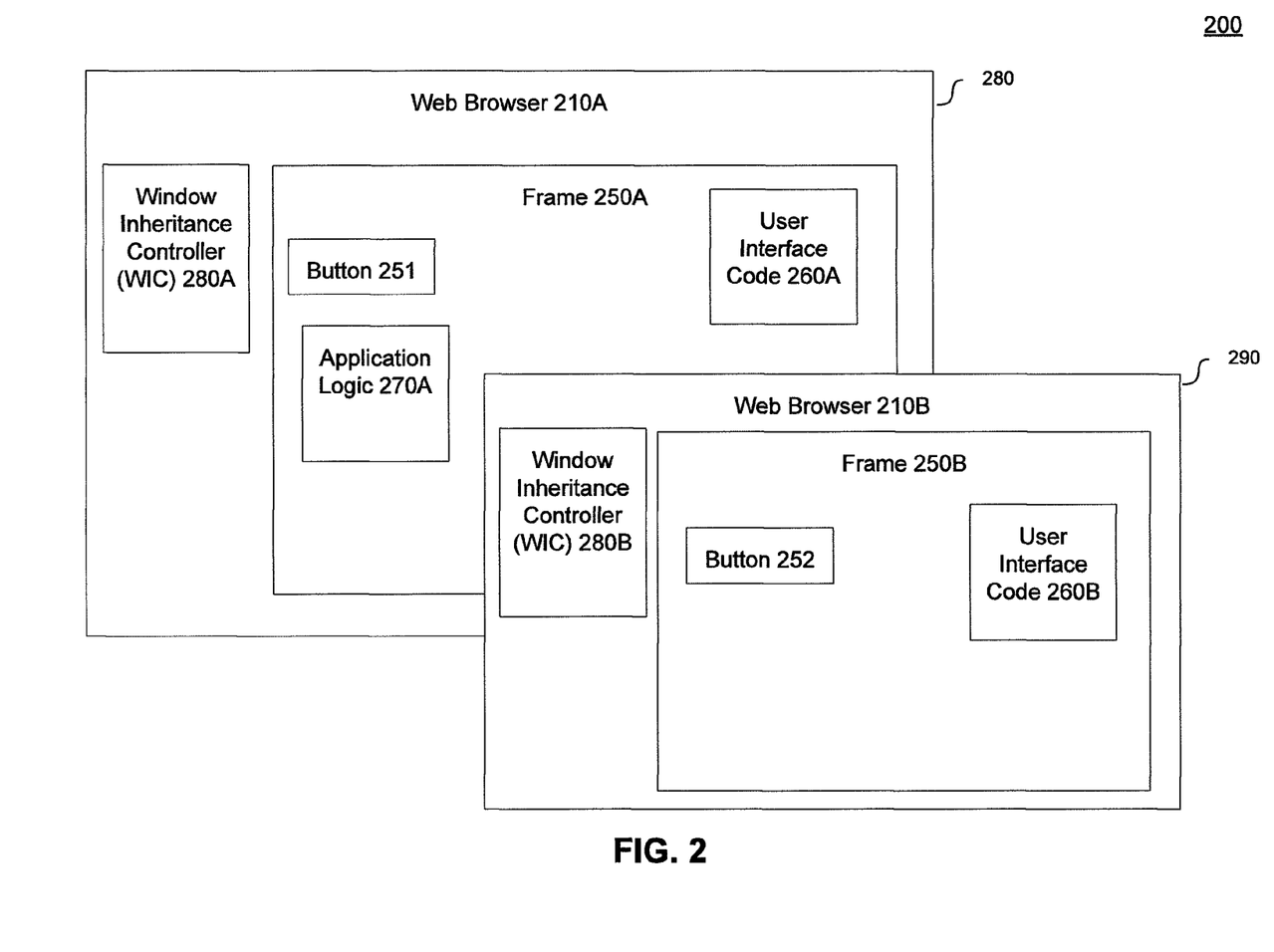
FIG. 2 is an illustration of a window inheritance controller in a web browser, according to an embodiment.

FIG. 2 is an illustration of multi-window web-application 200, according to an embodiment. FIG. 2 shows web browser windows 210A-B displaying frames 250A-B respectively. According to an embodiment, each web browser window 210A-B has a window inheritance controller (WIC) 280A-B respectively. In another embodiment, the web browser instance that manages web browser windows 210A-B can have WIC 280 (not shown).

In an embodiment, frame 250A is the main interface screen of a multi-window web-based application. In this example, frame 250A has user interface code 260A that displays button 251, and application logic 270A that performs client-side 106 application functions.

When button 251 is selected, in an embodiment the following steps S1-S5 occur. These steps are intended to be a broad description of the general steps used in an embodiment, and not intended to be limiting. All steps noted below need not be performed, and steps need not be necessarily performed in a particular order.

S1. Web browser window 210B is spawned, having new, empty frame 250B.

S2. Frame 250B is populated with user interface code 260B, such code including code for button 252.

S3. Frame 250B is not provided with a copy of application logic 270A, as is described with FIG. 1B above, rather frame 250B receives a handle pointing to frame 250A and the associated application logic 270A. As discussed with FIG. 1C above, this handle allows user interface code 260B to utilize client-side 106 routines from application logic 270A associated with parent frame 250A.

S4. Window inheritance controller 280A is configured to store this relationship between frame 250A and 250B.

S5. In this example, according to application logic, when button 252 in frame 250B is clicked, application flow requires that main interface screen 280 be closed, while retaining the display and contents (state) of pop-up window 290.

Transferring Application Logic

In the embodiment shown on FIG. 2, application logic 270A is moved from closing frame 250A to remaining pop-up frame 250B. As would be appreciated by one having skill in the relevant art(s), frames (as script objects) can be generally be passed from one HTML document displayed in one browser window to another HTML object in another browser window. Unfortunately, traditional approaches to moving frames provide only a code/data snapshot transfer and do not allow the transfer of active XMLHttpRequest connections, timers and other asynchronous processes currently active in the frame. Moving the frame in a traditional fashion causes all these active processes to be interrupted.

In an embodiment, frame 250B does not require the reloading of its current state and the context is not reset upon transfer. In an embodiment, the behavior of the frame 250B object has been modified so that it does not always unload during the transfer of application logic 270A as described above. A conditional execution is implemented in the frame element such that unloading does not occur if the application-specific condition is true.

In an embodiment, after the transfer, because the frame is not unloaded, frame scripts remain running, timers are not reset, connections to the server remain active, and the state remains intact when the application logic 270A passes from window 280 to 290.

In an embodiment, when a parent windows closes, the child window receives the transferred parent frame as an already-initialized shared object, saving time and memory space. In an embodiment, this modified behavior of an existing layout object is implemented in web-browser window 210.

One having skill in the relevant art(s) will appreciate that introducing a new frame-type element with the modified behavior described above might be difficult. Frames are used extensively in web-application layout, and introducing a new layout object that performs the desired behavior could cause confusion.

The elimination of the undesired behavior from an existing object would likely not solve the problem without potential negative impact. As noted in the background section above, backward-compatibility issues would arise from web applications that rely on the behavior. For example, currently it is not possible to transfer the ownership of a traditional iframe object to other windows without completely unloading the iframe and reloading it. If the iframe tag were modified such that it were not unloaded at the time ownership was transferred, web-applications that rely upon this automatic reloading would be negatively impacted.

In an embodiment, the existing frame element that is modified is an HTML iframe object. The conditional performance of the unloading step by the iframe object is controlled by the method commands used to perform the transfer. In an embodiment, when a combination of the "adoptNode" and "appendChild" methods are used by the application to perform the transfer, the application-specific condition is true and no unloading step is performed by the modified iframe element. These methods are used by an embodiment because they are not frequently used in web-layout. Thus, modifying their significance has a reduced effect on web-application backward compatibility. Both adoptNode and appendChild are commands that are a part of the Document Object Model (DOM) discussed above.

The adoptNode method attempts to adopt a node from a first document into a second document. If supported, the method changes the owner (ownerDocument property) of the source node, its children, as well as the attached attribute nodes if any. If the source node has a parent, it is first removed from the child list of its parent. This effectively allows moving a subtree from one document to another. In embodiments, to effect the transfer, the adopted node is appended into the second document with the appendChild method.

In an embodiment, the adoptNode method moves (adopts) an iframe (node) from one displayed window (document) in one browser window into a different displayed window (document) in a different browser window. The method changes the owner of the iframe from one HTML document to another. Once the iframe is appended into the new document using the appendChild method, the iframe is effectively moved from one window to another.

It is important to note that in an embodiment, it is the use of the adoptNode and appendChild that causes the new behavior of the iframe to be expressed, e.g., not reloading upon transfer. Merely using the noted commands with a traditional iframe object will cause the traditional reloading behavior. In an embodiment, web-browser window 210 and window inheritance controller 280A-B track the relationships between parent and child windows. In an embodiment, web-browser window 210 and window inheritance controller 280A-B also interpret the use of the modified iframe object and the transfer commands (e.g., the application-specific condition for iframe behavior modification), to determine whether to perform the above-described behaviors in multi-window web application 200.

Closing a Parent with Multiple Children

Figure 3:
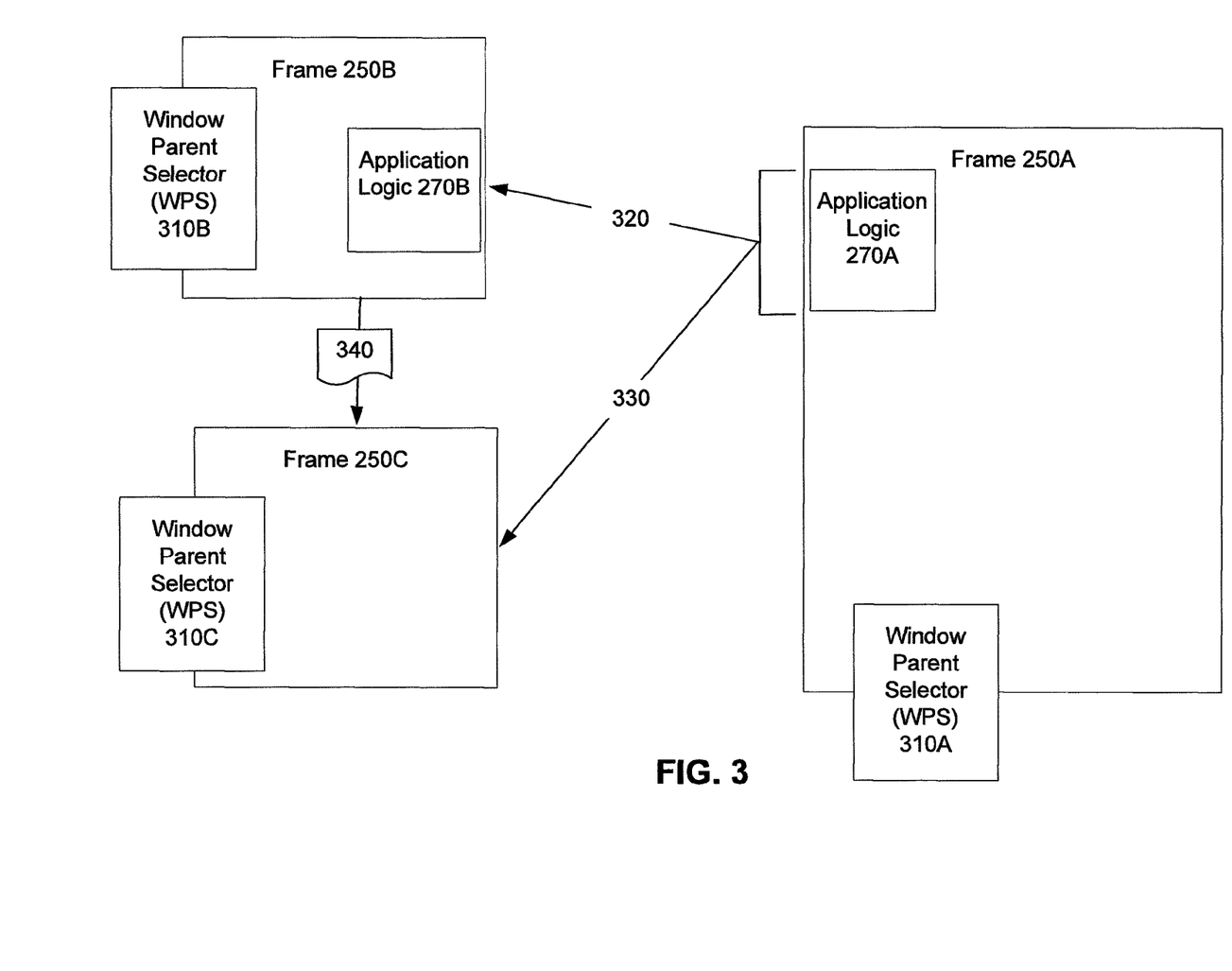
FIG. 3 is an illustration of a parent selector in a web browser, according to an embodiment.

FIG. 3 is an illustration of a parent selector in an improved web browser, according to an embodiment. FIG. 3 shows frames 250A-B from FIG. 2, further including, in an embodiment, a frame 250C. Frames 250A-C each further have window parent selectors (WPS) 310A-C respectively.

In an embodiment shown in FIG. 3, an additional frame 250C is open. In this example, frame 250C, as with frame 250B, has a handle to frame 250A and shares application logic 270A. As with the example discussed above with FIG. 2, in this example, frame 250A is set to close, thereby "orphaning" dependent child frames 250B-C.

According to an embodiment, each frame 250A-C contains a window parent selector (WPS) 310A-C respectively, and WPS 310A-C uses criteria to select which of the remaining windows should receive the application logic from the closing window. The window receiving the application logic will be referred to as the "leader" frame. Thus, because frame 250A is closing in this example, WPS 310A weighs criteria associated with dependent frames 250B-C to decide the transfer destination of application logic 270A.

In different embodiments, this selection criteria can be various characteristics about the potential destinations, e.g., C1-C5 below:

C1: The age of the potential destination frame.

C2: The physical dimensions of the potential destination frame.

C3: The amount of user interface code contained in the potential destination frame.

C4: The amount of time the potential destination frame has been displayed.

C5: The potential destination frame that is currently "in focus" on a display screen.

The list of criteria C1-C5 are intended to be illustrative only, and non-limiting. Criteria can be combined and weighed, and one having skill in the relevant art(s) will recognize additional related characteristics that can be advantageously used.

In an embodiment, once the new frame is selected by WPS 310 and receives the transferred application logic 270A, the newly selected "leader" frame notifies other children frames of the change, and new handles are established with the children. In this example, WPS 310A selects frame 250B because it is the oldest frame, and transfers application logic 270A via connection 320 to application logic 270B. Upon receiving the transferred logic, frame 250B sends notification 340 to frame 250C, thus establishing a new handle and relationship between the two frames, according to an embodiment.

In an embodiment, web-applications can be designed using this modified frame such that all frames can delegate their functionality to a primary frame. The primary frame can be "passed around" using the mechanisms described above to surviving windows at the moment that the primary frame closes, so that the primary frame always exists somewhere in the application. Thus, the primary frame can contain the whole logic of the application except the user interface, and the pages pass the frame around to the surviving windows.

Method

Figure 4:
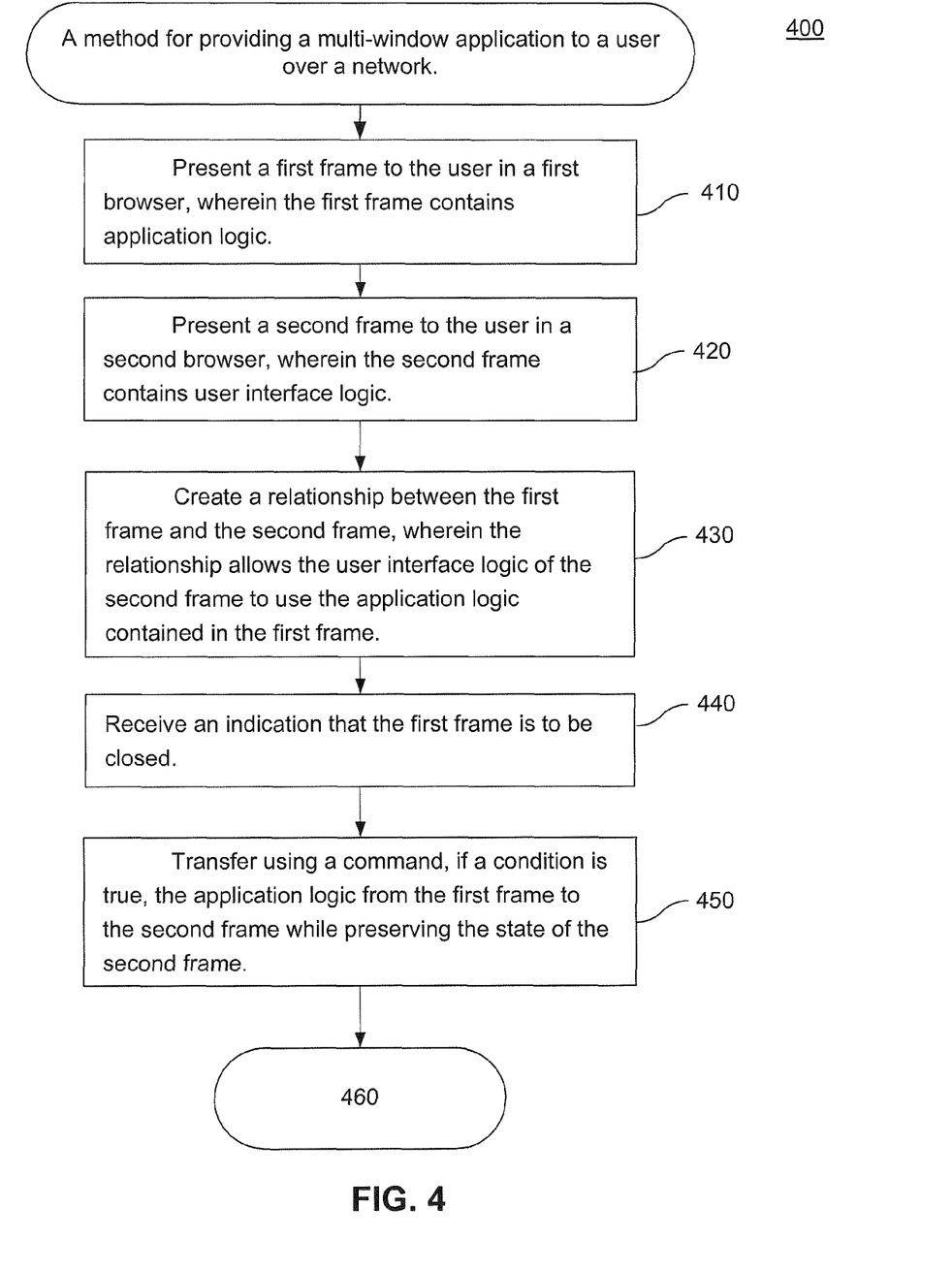
FIG. 4 is a flowchart illustrating a method of implementing a multi-window web-based application, according to an embodiment.

FIG. 4 illustrates a more detailed view of how embodiments described herein may interact with other embodiments. In this example, a method 400 for providing a multi-window application to a user over a network is shown. Initially, as shown in stage 410 on FIG. 4, a first frame is presented to the user, the first frame containing application logic. At stage 420, a second frame is presented to the user, the second frame containing user interface logic. At stage 430, a relationship is created between the first frame and the second frame, the relationship allowing the user interface logic of the second frame to use the application logic contained in the first frame, and at stage 440, an indication is received that the first frame is to be closed. At stage 450, if an application-specific condition is true, the application logic is transferred using a command from the first frame to the second frame while preserving the state of the second frame. Finally, at stage 460 the first frame is closed. After stage 460, the method operation ends.

Example Computer System Implementation

Figure 5:
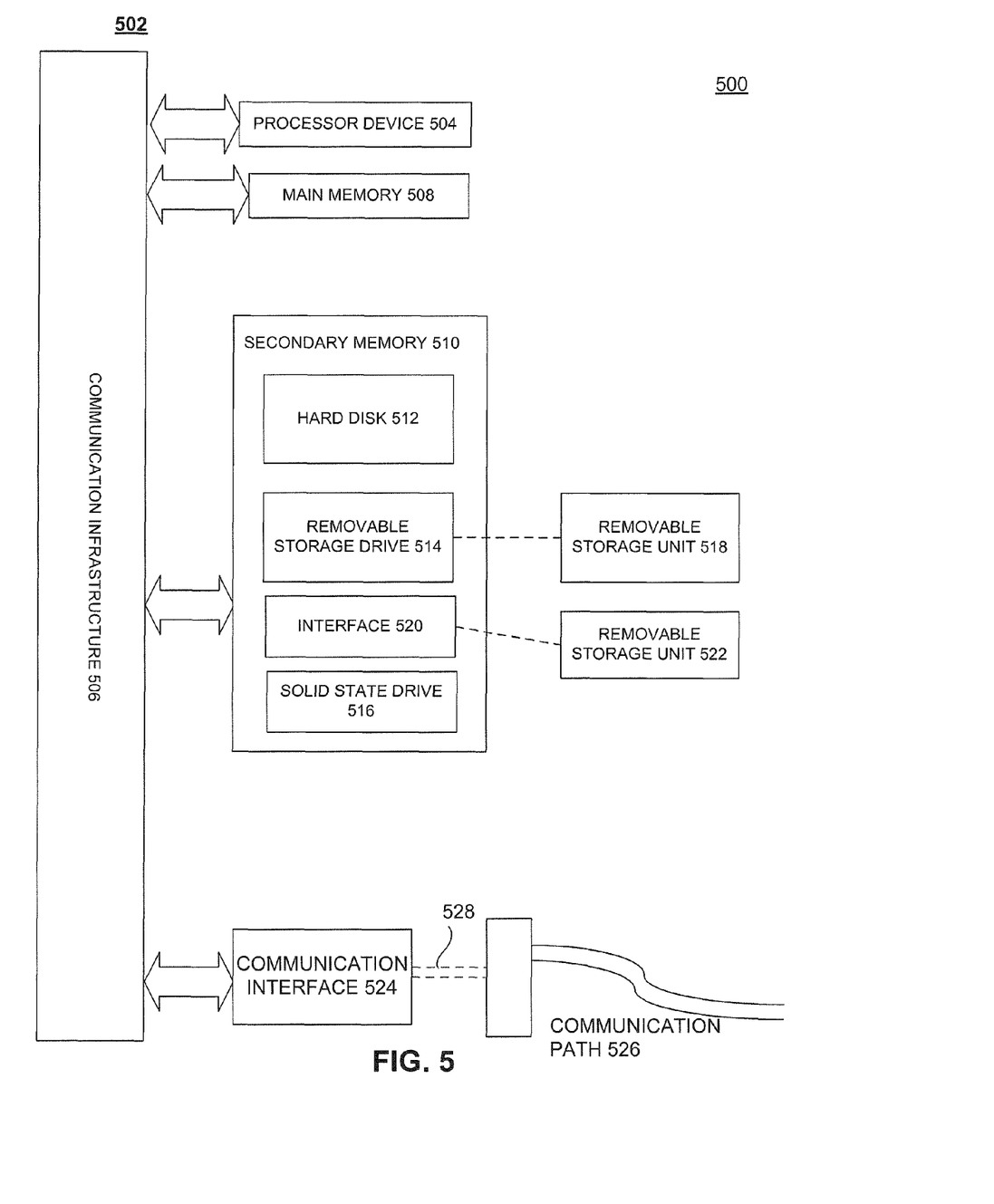
FIG. 5 depicts a sample computer system that may be used to implement one embodiment.

FIG. 5 illustrates an example computer system 500 in which embodiments of the present invention, or portions thereof, may be implemented as computer-readable code. For example, multi-window web application 200, FIGS. 2 and 3, and stages of method 400 of FIG. 4 may be implemented in computer system 500 using hardware, software, firmware, tangible computer readable media having instructions stored thereon, or a combination thereof and may be implemented in one or more computer systems or other processing systems. Hardware, software or any combination of such may embody any of the modules/components in FIGS. 2 and 3 and any stage in FIG. 4.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network or multi-core message-passing scheme.

Computer system 500 also includes a main memory 508, for example, random access memory (RAM), and may also include a secondary memory 510. Secondary memory 510 may include, for example, a hard disk drive 512, removable storage drive 514 and solid state drive 516. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 400 of FIG. 4 discussed above. Accordingly, such computer programs represent controllers of the computer system 500. Where the invention is implemented using software, the software may be stored in a computer program product and loaded into computer system 500 using removable storage drive 514, interface 520, hard disk drive 512 or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nanotechnological storage device, etc.).

CONCLUSION

Embodiments described herein relate to systems and methods for providing a multi-window application to a user over a network. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for providing a multi-window application to a user over a network, comprising:
    presenting a first frame in the multi-window application to the user, wherein the first frame contains application logic;
    presenting a second frame in the multi-window application to the user, wherein the second frame contains user interface logic;
    creating a third frame in the multi-window application, wherein the third frame contains user interface logic;
    creating a relationship between the first frame and the second frame, wherein the relationship allows the second frame to receive a first handle pointing to the first frame, and the first handle allows the user interface logic of the second frame to use the application logic contained in the first frame;
    creating a relationship between the first frame and the third frame, wherein the relationship allows the third frame to receive a first handle pointing to the first frame, and the second handle allows the user interface logic of the third frame to use the application logic contained in the first frame;
    receiving an indication that the first frame is to be closed;
    selecting, using a hardware processor, either the second frame or the third frame based on frame selection criteria;

upon receiving the indication, transferring the application logic from the first frame to the selected frame while preserving a state of the selected frame; and closing the first frame.

2. The method of claim 1, wherein transferring the application logic is performed by an adoptNode command.

3. The method of claim 1, wherein transferring the application logic is performed by an appendChild command.

4. The method of claim 1, wherein transferring the application logic is performed after an adoptNode command is used to adopt the application logic of the first frame to the selected frame.

5. The method of claim 1, wherein transferring the application logic is performed after an appendChild command is used to append the application logic of the first frame to the selected frame.

6. The method of claim 1, further comprising after the relationship is created:

storing the relationship between the first frame and the second frame using a window inheritance controller; and wherein the transferring the application logic from the first frame to the selected frame is managed using the window inheritance controller.

7. The method of claim 1, further comprising before the receiving an indication step:

generating an indication that the first frame is closing based on an event raised by the first frame.

8. The method of claim 1, wherein after transferring the application logic to the selected frame, creating a relationship between the selected frame and the non-selected frame, wherein the relationship allows the non-selected frame to receive a third handle pointing to the selected frame, and the third handle allows the user interface logic of the non-selected frame to use the transferred application logic contained in the selected frame.

9. The method of claim 1, wherein the frame selection criteria comprises a measure of which frame is the oldest.

10. The method of claim 1, wherein the frame selection criteria comprises a measure of which frame has the largest physical dimensions.

11. The method of claim 1, wherein the frame selection criteria comprises a measure of which frame has been displayed for the longest amount of time.

12. A system for providing a multi-window application to a user over a network, comprising:

a processor;

a memory coupled to the processor;

a first frame element in the multi-window application displayed to the user, wherein the first frame element contains application logic;

a second frame element in the multi-window application displayed to the user, wherein the second frame element has a first handle to the first frame element that allows use of the application logic;

a third frame element in the multi-window application wherein the third frame element has a second handle to the first frame element that allows use of the application logic; and a window inheritance controller configured to:

receive an indication that the first frame element is to be closed;

select, using a hardware processor, either the second frame element or the third frame element based on frame selection criteria;

transfer the application logic from the first frame element to the selected frame element while preserving a state of the selected frame element; and close the first frame.

13. The system of claim 12 wherein the window interface controller is configured to transfer the application logic using an adoptNode command.

14. The system of claim 12 wherein the window interface controller is configured to transfer the application logic using an appendChild command.

15. The system of claim 12, wherein the window interface controller is configured to transfer the application logic when an adoptNode command is used to adopt the application logic of the first frame element to the selected frame element.

16. The system of claim 12, wherein the window interface controller is configured to transfer the application logic when an appendChild command is used to append the application logic of the first frame element to the selected frame element.

17. The system of claim 12, wherein the frame elements are HTML iframe elements.

18. The system of claim 12, wherein the window interface controller is configured to, after transferring the application logic, create a relationship between the selected frame and the non-selected frame, wherein the relationship allows the non-selected frame to receive a third handle pointing to the selected frame, and the third handle allows the user interface logic of the non-selected frame to use the transferred application logic contained in the selected frame.

19. The method of claim 12, wherein the selection criteria comprises a measure of which frame is the oldest.

20. The method of claim 12, wherein the selection criteria comprises a measure of which frame has the largest physical dimensions.

21. The method of claim 12, wherein the selection criteria comprises a measure of which frame has been displayed for the longest amount of time.

22. A non-transitory computer-readable medium having computer-readable instructions encoded thereon that, when executed by a processor cause the processor to perform a method for providing a multi-window application to a user over a network, the method comprising:

presenting a first frame in the multi-window application to the user, wherein the first frame contains application logic;

presenting a second frame in the multi-window application to the user, wherein the second frame contains user interface logic;

creating a third frame in the multi-window application, wherein the third frame contains user interface logic;

creating a relationship between the first frame and the second frame, wherein the relationship allows the second frame to receive a first handle pointing to the first frame, and the first handle allows the user interface logic of the second frame to use the application logic contained in the first frame;

creating a relationship between the first frame and the third frame, wherein the relationship allows the third frame to receive a second handle pointing to the first frame, and the second handle allows the user interface logic of the third frame to use the application logic contained in the first frame;

receiving an indication that the first frame is to be closed;

selecting, using a hardware processor, either the second frame or the third frame based on frame selection criteria;

upon receiving the indication, transferring the application logic from the first frame to the selected frame while preserving a state of the selected frame; and
closing the first frame.

* * * * *

UNITED STATES PATENT AND TRADEMARK OFFICE
CERTIFICATE OF CORRECTION

| | | |
|---|---|---|
| PATENT NO. | : 8,850,354 B1 | Page 1 of 1 |
| APPLICATION NO. | : 12/784888 | |
| DATED | : September 30, 2014 | |
| INVENTOR(S) | : Titov et al. | |

It is certified that error appears in the above-identified patent and that said Letters Patent is hereby corrected as shown below:

On the Title Page, Item (57), Abstract, please replace "to the," with --to the user,--.

Signed and Sealed this
Fifth Day of May, 2015

Michelle K. Lee
*Director of the United States Patent and Trademark Office*